Figure 1:
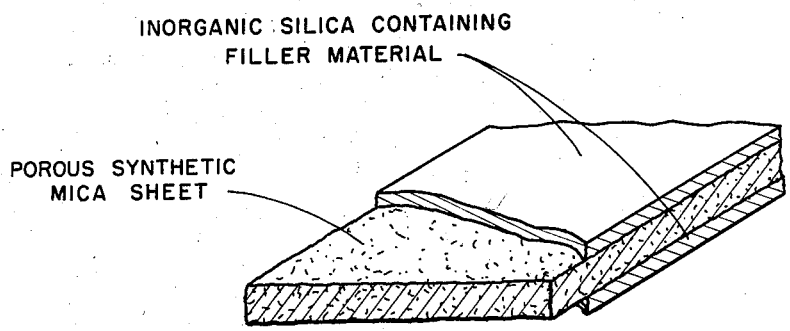

Nov. 11, 1958     F. A. BARR     2,859,794

SYNTHETIC MICA PRODUCT

Filed Nov. 30, 1955

INVENTOR.
FRANCIS A. BARR

BY

ATTORNEY

United States Patent Office 2,859,794
Patented Nov. 11, 1958

2,859,794
SYNTHETIC MICA PRODUCT

Francis A. Barr, Merrick, N. Y., assignor to Sylvania Electric Products Inc., a corporation of Massachusetts Application November 30, 1955, Serial No. 550,236

4 Claims. (Cl. 154—2.6)

My invention is directed toward synthetic mica structures and methods for making the same.

The term "mica" or "the micas" defines a group of hydrated alumino silicate minerals which have a high dielectric strength and which possess a characteristic analogous crystallographic sheet-like structure. This structure is flexible and transparent and has a high degree of cleavability (i. e. the sheet-like structure can be divided and subdivided into extremely thin sheets).

Physically, mica is composed of sheets or layers of aluminium hydroxide and/or magnesium hydroxide sandwiched between two silica layers, this sequence of layers being repeated indefinitely to form a mica sheet.

Mica is extensively used by the electrical industry, for example, as a dielectric material for capacitors, as electrode supports in electron tubes, and the like. However, it has certain inherent disadvantages. For example, at temperatures on the order of 800° C. and higher, mica becomes dehydrated and disintegrates. Further, mica, being a mineral, can take various forms such as Muscovite (potassium mica), Phlogopite (magnesium mica) and Biotite (magnesium-iron mica). Therefore, its properties are not uniform; for example, its dielectric constant attains a range of values rather than having one established value.

Attempts have been made to overcome these disadvantages by producing mica synthetically to provide a sheet-like structure differing from the natural mica in that the hydroxyl ions contained in the hydroxide layers of natural mica are replaced by fluorine ions.

Such synthetic (fluorine) mica has been produced in the form of chunks containing microscopically sized mica crystals. These chunks are then broken down into minute flakes, for example, by grinding in aqueous media; these flakes are then permitted to settle out of such media onto a suitable surface (as for example a moving belt) in the form of a reconstituted mica sheet; the sheet is dried; and finally a number of such sheets are stacked in a die and hot pressed to produce what is known to the art as a recrystallized hot pressed sheet of reconstituted synthetic mica.

Sheets of this type will not become dehydrated at elevated temperatures. Moreover, the properties of these sheets are more nearly uniform than natural mica.

As compared to natural mica, however, this synthetic mica product is mechanically weak and further has unsatisfactory electrical properties. For example, the modulus of rupture for natural mica averages about 55,000 pounds per square inch; that of the synthetic product ranges between 8–15,000 p. s. i. The modulus of shear for natural mica ranges between 1000–2000 pounds per inch as contrasted to 93–185 pounds per inch for the synthetic product. Moreover, the dielectric strength of natural mica (2000–6000 volts per mil) is much larger than that of the synthetic product (300–450 volts per mil).

In my copending application Serial No. 544,576 filed November 1, 1955, I disclosed a new process in which synthetic mica sheet produced in a manner well known to the art is treated with at least one mineralizer selected from the class of inorganic fluorine compounds which while in contact with the mica sheet and heated yield silica tetrafluoride as a vapor phase. The treated sheet is hot pressed. The resultant structure as compared to the known synthetic mica product exhibits sharply increased mechanical and dielectric strength.

As disclosed in more detail in the above-identified application, synthetic mica products produced in accordance with the above process are structurally different from the known synthetic mica products and possess improved mechanical and electrical properties. To differentiate between these two types of products, I define the synthetic mica products produced in accordance with my process as mineralized recrystallized hot pressed sheets of reconstituted synthetic mica.

Even though the mineralized synthetic mica product is markedly superior to the non-mineralized product, both types of synthetic mica product exhibit a dielectric strength which is substantially less than natural mica. For example natural mica has a dielectric strength which ranges between 2000–6000 volts per mil as compared to 600–630 volts per mil for the mineralized synthetic product, and 300–450 volts per mil for the non-mineralized synthetic product.

It is an object of the present invention to increase the dielectric strength of mineralized and non-mineralized synthetic mica products.

Another object is to provide mineralized and non-mineralized synthetic mica products characterized by sharply increased dielectric strength and further to provide processes for producing the same.

Still another object is to increase the dielectric strength of mineralized and non-mineralized synthetic mica products through the use of an inorganic filler material.

These and other objects of my invention will either be explained or will become apparent hereinafter.

Recrystallized hot pressed sheets of reconstituted synthetic mica when examined under a microscope will be found to contain numerous minute pores or voids. These pores or voids are also found to a lesser degree in the mineralized product. Stated differently, both mineralized and non-mineralized synthetic mica products are porous, although the degree of porosity of the non-mineralized product is accentuated as compared to the mineralized product.

In accordance with my invention, the surface pores or voids which are present in both mineralized and non-mineralized recrystallized hot pressed sheets of reconstituted synthetic mica are sealed or closed with an inorganic silica containing filler material as, for example, by spraying ground glass particles (carried by a suitable vehicle such as lacquer) onto the surfaces of the sheets and hot pressing the sprayed structure, or by hot pressing a plate of condenser grade thin ribbon glass between two sheets of the synthetic mica. Both mineralized and non-mineralized synthetic mica sheets when treated in this manner exhibit sharply increased dielectric strength.

Two plates of condenser grade thin ribbon glass were placed around a mineralized recrystallized hot pressed sheet of reconstituted synthetic mica. The composite structure was then hot pressed in the manner described above to produce the structure shown in Fig. 3. The dielectric strength of the glass clad mica was found to be about 800 volts per mil.

Specifically, the dielectric strength of the mineralized product approaches that of natural mica, and the dielectric strength of the non-mineralized product, while not approaching this value, is also markedly increased.

Many different types of silica containing materials can be used as a filler as, for example, a glass, or a mineral topaz, or amorphous silica of a "flaky" nature. However, the filler material, whatever its chemical properties, must be electrically non-conductive; it must withstand the elevated temperatures to which the final mica product will be subjected; it must require firing temperatures insufficiently high to destroy the mineralized or non-mineralized synthetic mica sheet. I have found that while these materials can be used in the form of powders, better results are obtained when these materials are formed into small flake like particles. More specifically, for a given weight of a given material, use of flaky materials will provide a more complete sealing action than that obtained through the use of powders.

Figure 2:
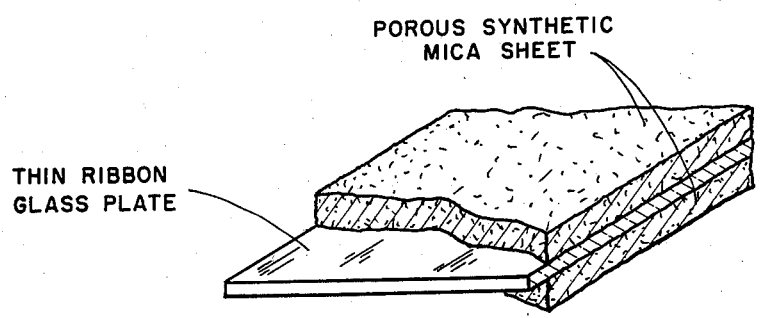
Figure 3:
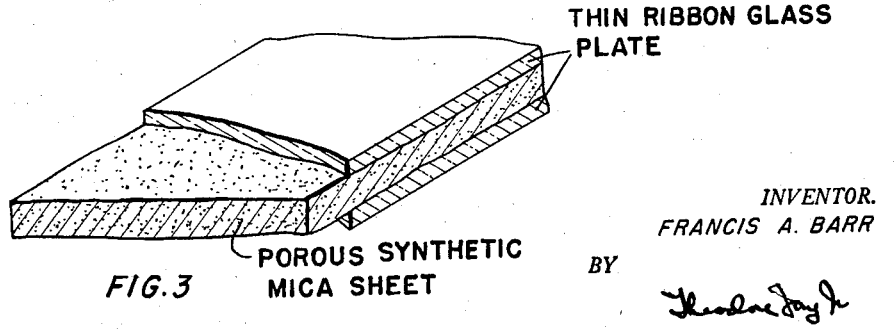

My invention will now be described in detail in the working examples which follow with specific reference to the accompanying drawing wherein Fig. 1 illustrates a mineralized recrystallized hot pressed sheet of reconstituted synthetic mica having surface pores sealed off with an inorganic silica containing filler material, and Figs. 2 and 3 illustrate variations of the structure shown in Fig. 1.

Example I

Two mineralized recrystallized hot pressed sheets of reconstituted synthetic mica were placed around a plate of condenser grade thin ribbon glass. This composite structure was then hot pressed at a temperature of 615° C. and at a pressure of 600 pounds per square foot for a period of seven minutes to produce the structure shown in Fig. 2.

The dielectric strength of the mica clad glass was found to be 800 volts per mil.

Example II

Borosilicate glass particles ground to pass through a 325 mesh screen were mixed with a conventional lacquer and sprayed onto the surfaces of two or more mineralized synthetic mica sheets. The coated sheets were then stacked in a mold and hot pressed at a temperature of 1200° C. and at a pressure of 1000 pounds per square foot for a period of twelve minutes to produce the structure shown in Fig. 1.

The dielectric strength of this structure was found to be 1000 volts per mil.

While I have shown and pointed out my invention as applied above, it will be apparent to those skilled in the art that many modifications can be made within the scope and sphere of my invention as defined in the claims which follow:

What is claimed is:

1. A mica structure comprising a porous sheet of a fluoride-mineralized, recrystallized, hot pressed, synthetic mica, the surface pores of said sheet being sealed with an inorganic, electrically non-conductive, silica-containing filler material, the interior pores of said sheet being free from said material.

2. A mica structure comprising a porous sheet of a fluoride-mineralized, recrystallized, hot pressed, synthetic mica, the surface pores of said sheet being sealed with an inorganic, electrically non-conductive, silica-containing filler material, the interior pores of said sheet being free from said material, said sealed sheet having a dielectric strength of about 630 volts per mil.

3. In combination, first and second sheets of condenser grade, thin ribbon glass; and a porous sheet of a fluoride-mineralized, recrystallized, hot pressed, synthetic mica, said mica sheet being interposed between and bonded to both glass sheets, said glass sheets sealing off the surface pores of said mica sheet, the interior pores of said mica sheet being out of contact with said glass sheets.

4. In combination, first and second sheets of condenser grade, thin ribbon glass; and a porous sheet of a fluoride-mineralized, recrystallized, hot pressed, synthetic mica, said mica sheet being interposed between and bonded to both glass sheets, said glass sheets sealing off the surface pores of said mica sheet, the interior pores of said mica sheet being out of contact with said glass sheets, the resultant laminated sheet structure having a minimum dielectric strength of about 800 volts per mil.

References Cited in the file of this patent

UNITED STATES PATENTS

| Number | Name | Date |
|---|---|---|
| 1,471,283 | Rogers | Oct. 16, 1923 |
| 1,578,813 | Dawes et al. | Mar. 30, 1926 |
| 1,750,305 | Gross | Mar. 11, 1930 |
| 2,479,357 | Hill et al. | Aug. 16, 1949 |
| 2,493,693 | Parkinson | Jan. 3, 1950 |
| 2,493,694 | Shepard | Jan. 3, 1950 |
| 2,516,983 | Hatch | Aug. 1, 1950 |
| 2,529,566 | Monack | Nov. 14, 1950 |

FOREIGN PATENTS

| Number | Country | Date |
|---|---|---|
| 524,904 | Belgium | June 8, 1954 |
| 449,304 | Italy | June 11, 1949 |

OTHER REFERENCES

Mica Products With Inorganic Binder—a pamphlet published by the New England Mica Company, Waltham, Mass., in 1931 (page 7 of interest).

Kendall et al.: Article entitled, "Synthetic Mica," appearing in the 1947 reprint of the Proceedings of the International Congress of Pure and Applied Chemistry; pp. 167–170.

"Rapid Insulator Production With Glass-Bonded Mica" by A. J. Monack, an article appearing in the February 1947 issue of Ceramic Industry magazine, page 59 of interest.

Comeforo et al.: Article entitled, "Synthetic Mica Investigations: 1, A Hot-Pressed Machinable Ceramic Dielectric" appearing in the Journal of the American Ceramics Society, vol. 36, No. 9 (1953), pp. 286–294.